US012254824B2

(12) United States Patent
Chen et al.

(10) Patent No.: US 12,254,824 B2
(45) Date of Patent: Mar. 18, 2025

(54) PIXEL CIRCUIT FOR LOWER POWER CONSUMPTION

(71) Applicant: AUO Corporation, Hsin-Chu (TW)

(72) Inventors: Ying-Chieh Chen, Hsin-Chu (TW); Yi-Fu Ou, Hsin-Chu (TW); Yung-Hsiang Lan, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 18/542,829

(22) Filed: Dec. 18, 2023

(65) Prior Publication Data

US 2025/0022405 A1 Jan. 16, 2025

(30) Foreign Application Priority Data

Jul. 11, 2023 (CN) ......................... 202310842882.5

(51) Int. Cl.
*G09G 3/32* (2016.01)

(52) U.S. Cl.
CPC ....... *G09G 3/32* (2013.01); *G09G 2300/0842* (2013.01); *G09G 2300/0876* (2013.01); *G09G 2310/08* (2013.01); *G09G 2330/021* (2013.01)

(58) Field of Classification Search
CPC ... G09G 3/32–3291; G09G 2300/0819; G09G 2300/0842; G09G 2300/0852; G09G 2300/0871; G09G 2300/0876; G09G 2310/0243–0251; G09G 2310/06–063; G09G 2310/08; G09G 2320/0233; G09G 2320/0242; G09G 2320/04; G09G 2330/02; G09G 2330/021
See application file for complete search history.

(56) References Cited

U.S. PATENT DOCUMENTS

| | | | | |
|---|---|---|---|---|
| 2014/0139505 A1* | 5/2014 | Han | G09G 3/3233 345/212 |
| 2015/0187266 A1 | 7/2015 | Qian et al. | |
| 2020/0098318 A1* | 3/2020 | Liu | G09G 3/3291 |
| 2020/0302863 A1 | 9/2020 | Xuan et al. | |
| 2022/0114947 A1 | 4/2022 | Chang et al. | |
| 2023/0377519 A1* | 11/2023 | Ge | G09G 3/3233 |

FOREIGN PATENT DOCUMENTS

| | | |
|---|---|---|
| CN | 102930824 A | 2/2013 |
| CN | 104916255 A | 9/2015 |

* cited by examiner

*Primary Examiner* — Nathan Danielsen
(74) *Attorney, Agent, or Firm* — WPAT, PC

(57) ABSTRACT

A pixel circuit includes a driving transistor, a storage capacitor, a first transistor, a second transistor, a third transistor and a fourth transistor. A first end of the driving transistor is electrically coupled to a system high voltage terminal. The driving transistor is configured to control a driving current supplied to a light emitting element. A first end of the storage capacitor is electrically coupled to a control end of the driving transistor. A first end of the first transistor is electrically coupled to a second end of the storage capacitor, and a second end of the first transistor is configured to receive a data signal. When the first transistor is turned on according to the first control signal, the storage capacitor resets a voltage at the control end of the driving transistor, by a capacitive coupling effect, according to a change in voltage of the data signal.

17 Claims, 7 Drawing Sheets

PIXEL CIRCUIT FOR LOWER POWER CONSUMPTION

RELATED APPLICATIONS

This application claims priority to China Application Serial Number 202310842882.5, filed Jul. 11, 2023, which is herein incorporated by reference.

BACKGROUND

Field of Invention

The disclosure relates to a pixel circuit. More particularly, the disclosure relates to a pixel circuit with reset operation.

Description of Related Art

Nowadays, displays are widely used. For certain pixel circuits, there may be a leakage current flowing from a high voltage terminal to a reference voltage terminal when a reset operation is performed. In this case, even if a display image is adjusted to a minimum brightness, it still causes high power consumption. Besides, the image quality of the display may be affected if the reset operation of the pixel circuit is incomplete. Therefore, how to provide a pixel circuit to solve the above problems is an important issue in this field.

SUMMARY

In order to solve the foregoing problems, one aspect of the present disclosure is related to a pixel circuit which includes a driving transistor, a storage capacitor, a first transistor, a second transistor, a third transistor and a fourth transistor. A first end of the driving transistor is electrically connected to a system high voltage terminal. The driving transistor is configured to control a driving current provided to a light emitting element. A first end is electrically connected to a control end of the driving transistor. A first end of the first transistor is electrically connected to a second end of the storage capacitor. A second end of the first transistor is configured to receive a data signal. The second transistor is electrically connected between a second end of the driving transistor and the control end of the driving transistor. A first end of the third transistor is configured to receive a reference voltage. A second end of the third transistor electrically connected to a second end of the storage capacitor. The fourth transistor is electrically connected between the second end of the driving transistor and a system low voltage terminal. When the first transistor is turned on according to a first control signal, the storage capacitor resets the voltage at the control end of the driving transistor by capacitive coupling effect according to a voltage variation of the data signal.

Another aspect of the present disclosure is related to a pixel circuit which includes a driving transistor, a storage capacitor, a first transistor, a second transistor, a third transistor, a fourth transistor and a fifth transistor. A first end of the driving transistor is electrically connected to a system high voltage terminal. The driving transistor is configured to control a driving current provided to a light emitting element. A first end of the storage capacitor is electrically connected to a control end of the driving transistor. A first end of the first transistor is electrically connected to a second end of the storage capacitor. A second end of the first transistor is configured to receive a data signal. The second transistor is electrically connected between a second end of the driving transistor and the control end of the driving transistor. A first end of the third transistor is configured to receive a first reference voltage. A second end is electrically connected to the second end of the storage capacitor. The fourth transistor is electrically connected between the second end of the driving transistor and a system low voltage terminal. A first end of the fifth transistor is electrically connected to the second end of the storage capacitor. A second end of the fifth transistor is configured to receive a second reference voltage.

Another aspect of the present disclosure is related to a pixel circuit which includes a driving transistor, a storage capacitor, a first transistor, a second transistor, a third transistor, a fourth transistor, a fifth transistor and a reset capacitor. A first end of the driving transistor is electrically connected to a system high voltage terminal. The driving transistor is configured to control a driving current provided to a light emitting element. A first end of the storage capacitor is electrically connected to a control end of the driving transistor. A first end of the first transistor is electrically connected to a second end of the storage capacitor. A second end of the first transistor is configured to receive a data signal. The second transistor is electrically connected between a second end of the driving transistor and the control end of the driving transistor. A first end of the third transistor is configured to receive a first reference voltage. A second end of the third transistor is electrically connected to the second end of the storage capacitor. The fourth transistor is electrically connected between the second end of the driving transistor and a system low voltage terminal. A first end pf the fifth transistor is configured to receive a second reference voltage. A first end of the reset capacitor is electrically connected to a second end of the fifth transistor. A second end of the reset capacitor is electrically connected to the control end of the driving transistor.

Summary, the operation of pixel circuit includes a reset operation, and a path between the system high voltage terminal and the reference voltage terminal in the pixel circuit can be electrically isolated during the reset period, so as to avoid generating the leakage current during the reset period, so that the power consumption can be reduced.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. In the drawings.

DETAILED DESCRIPTION

Figure 1:
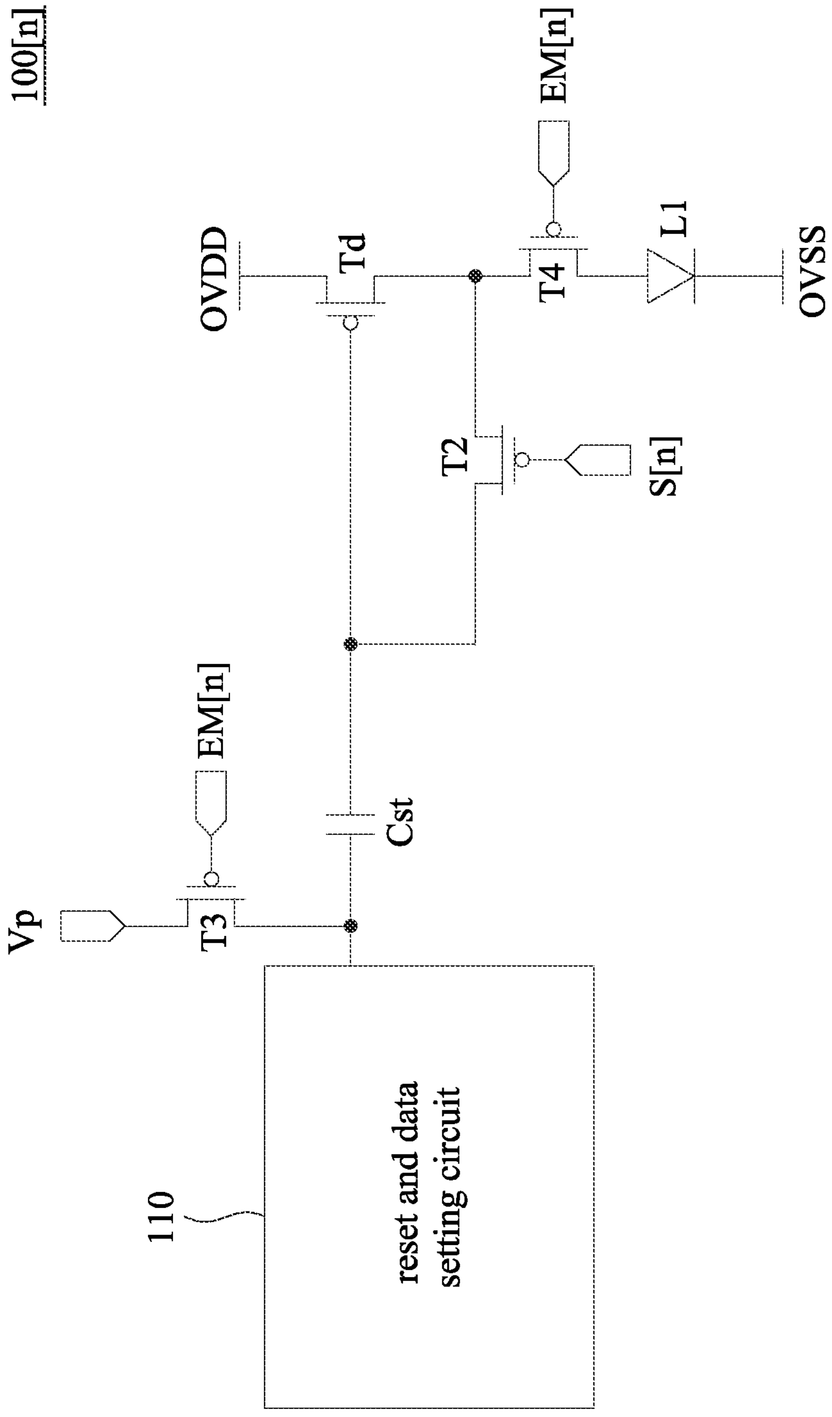
FIG. 1 depicts a pixel circuit according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms “comprise” or “comprising,” “include” or “including,” “have” or “having,” “contain” or “containing” and the like used herein are to be understood to be open-ended, i.e., to mean including but not limited to.

A description is provided with reference to FIG. 1. FIG. 1 depicts a pixel circuit 100[*n*] according to some embodiments of the present disclosure. As shown in FIG. 1, the pixel circuit 100[*n*] includes a driving transistor Td, a second transistor T2, a third transistor T3, a third transistor T3, a storage capacitor Cst, a reset and data setting circuit 110 and a light emitting element L1. In some embodiments, the pixel circuit 100[*n*] refers to a pixel circuit corresponding to a sub-pixel of in the n-th pixel line of a pixel array. In some embodiments, the light emitting element L1 can be implemented by a micro-light emitting diode. In the other embodiments, the light emitting element L1 can be implemented by a light emitting diode in other size, such as, mini-light emitting diodes. Therefore, it is not intended to limit the present disclosure.

In some embodiments, a voltage variation transferred by the reset and data setting circuit 110 changes a voltage at a control end of the driving transistor Td to an enable voltage by coupling effect of the storage capacitor Cst, in order to perform reset operation.

In some embodiments, the control signal S[n] is applied to the second transistor T2 to compensate a threshold voltage of the driving transistor Td.

In some embodiments, the emission control signal EM[n] is applied to the fourth transistor T4 to conduct a current path between a drain end of the driving transistor Td and a system low voltage terminal OVSS. The driving transistor Td is disposed at a current path of the driving current flowing from a system high voltage terminal OVDD to the system low voltage terminal OVSS. As such, the driving transistor Td controls the amplitude of the said driving current according to a voltage at the control end of the driving transistor Td. The light emitting element L1 is disposed at the current path of the driving current to emit light according to the driving current.

In some embodiments, each of the aforesaid transistors has a first end, a second end and a control end (gate). If a first end of a transistor is a drain end (/source end), a second end of the transistor is a source end (/drain end). And, each of the aforesaid capacitors has a first end and a second end. If a first end of a capacitor is anode (/cathode), a second end of the capacitor is cathode (/anode).

In structure, the driving transistor Td, the fourth transistor T4 and the light emitting element L1 are electrically connected in series between the system high voltage terminal OVDD and the system low voltage terminal OVSS. In some embodiments, the driving transistor Td is electrically connected between the system high voltage terminal OVDD and the system low voltage terminal OVSS. In some embodiments, the first end of the driving transistor Td is electrically connected to the system high voltage terminal OVDD.

In some embodiments, the fourth transistor T4 is electrically connected between the driving transistor Td and the light emitting element L1. In some embodiments, a first end of the fourth transistor T4 is electrically connected to the second end of the driving transistor Td, and a second end of the fourth transistor T4 is connected to a first end of the light emitting element L1. In some embodiments, a control end of the fourth transistor T4 is configured to receive an emission control signal EM[n].

In some embodiments, the light emitting element L1 is electrically connected between the fourth transistor T4 and the system low voltage terminal OVSS. In some embodiments, the first end of the light emitting element L1 is electrically connected to the second end of the fourth transistor T4, and a second of the light emitting element L1 is electrically connected to the system low voltage terminal OVSS.

In some embodiments, the second transistor T2 is electrically connected between the control end of the driving transistor Td and the second end of the driving transistor Td. In some embodiments, a first end of the second transistor T2 is electrically connected to the control end of the driving transistor Td, and a second end of the second transistor T2 is electrically connected to a second end of the driving transistor Td. In some embodiments, a control end of the second transistor T2 is configured to receive a control signal Sn[n].

In some embodiments, a first end of the third transistor T3 is configured to receive a reference voltage Vp, and a second end of the third transistor T3 is electrically connected to a second end of the storage capacitor Cst. In some embodiments, a control end of the third transistor T3 is configured to receive an emission control signal EM[n]. In some embodiments, the emission control signal EM[n] is a local signal if the pixel circuits included in the pixel array are active in a row sequence. In the other embodiments, the emission control signal EM[n] is a global signal if all pixel circuits included in the pixel array are active at the same time, which is not intended to limit the present disclosure.

Figure 2A:
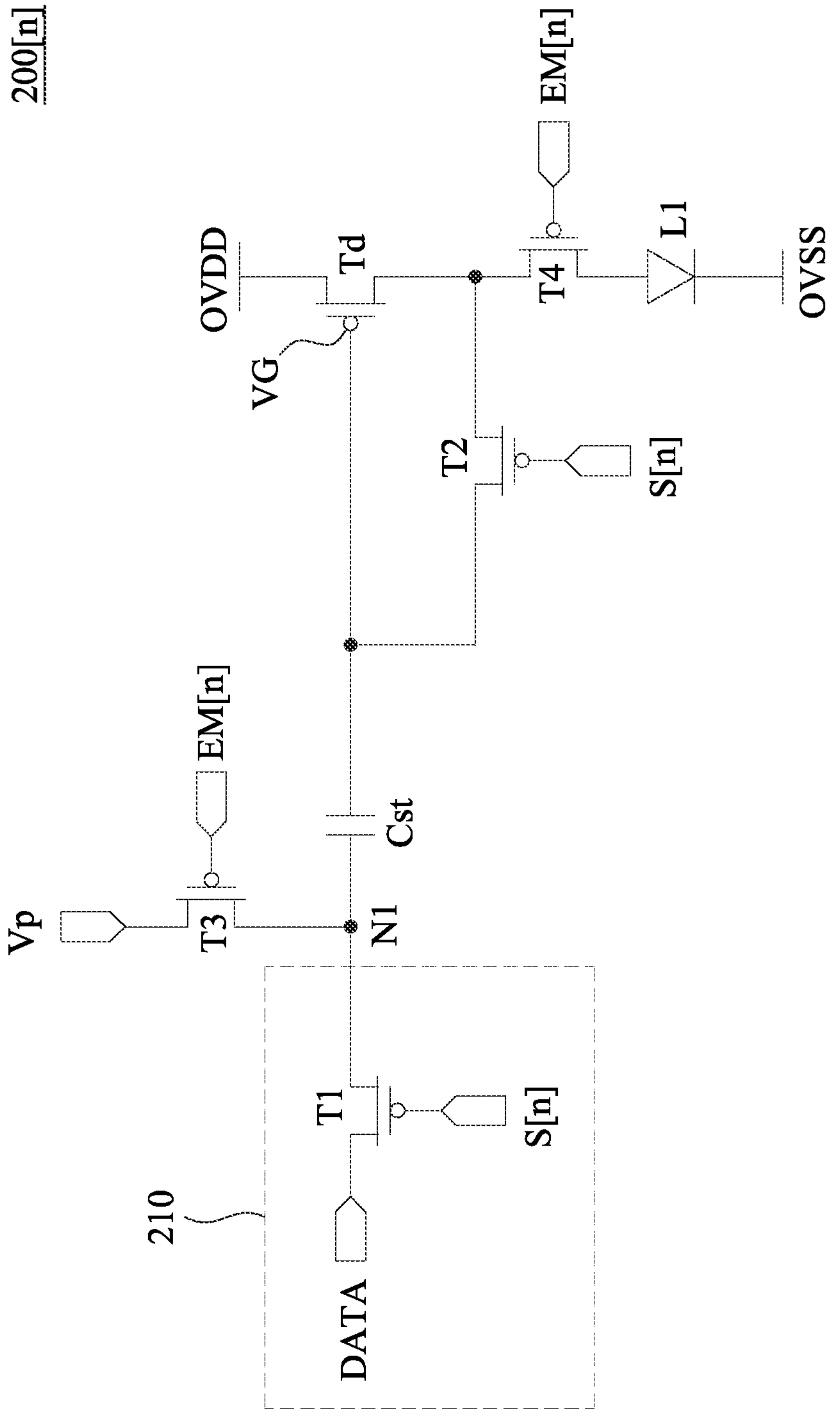
FIG. 2A depicts a pixel circuit according to some embodiments of the present disclosure.

A description is provided with reference to FIG. 2A. FIG. 2A depicts a pixel circuit 200[*n*] according to some embodiments of the present disclosure. In some embodiments, the pixel circuit 200[*n*] corresponds to the pixel circuit 100[*n*] in FIG. 1. As shown in FIG. 2A, the pixel circuit 200[*n*] includes a driving transistor Td, a second transistor T2, a third transistor T3, a fourth transistor T4, a storage capacitor Cst, a reset and data setting circuit 210 and a light emitting element L1.

In some embodiments, the reset and data setting circuit 210 includes a first transistor T1. Specifically, a first end of the first transistor T1 is electrically connected to a second end of the storage capacitor Cst, and a second end of the first transistor T1 is configured to receive a data signal DATA. In some embodiments, a control end of the first transistor T1 is configured to receive a control signal Sn[n]. In some embodiments, the node N1 refers to a connection between the first end of the first transistor T1, the second end of the storage capacitor Cst and the second end of the third transistor T3.

Figure 2B:
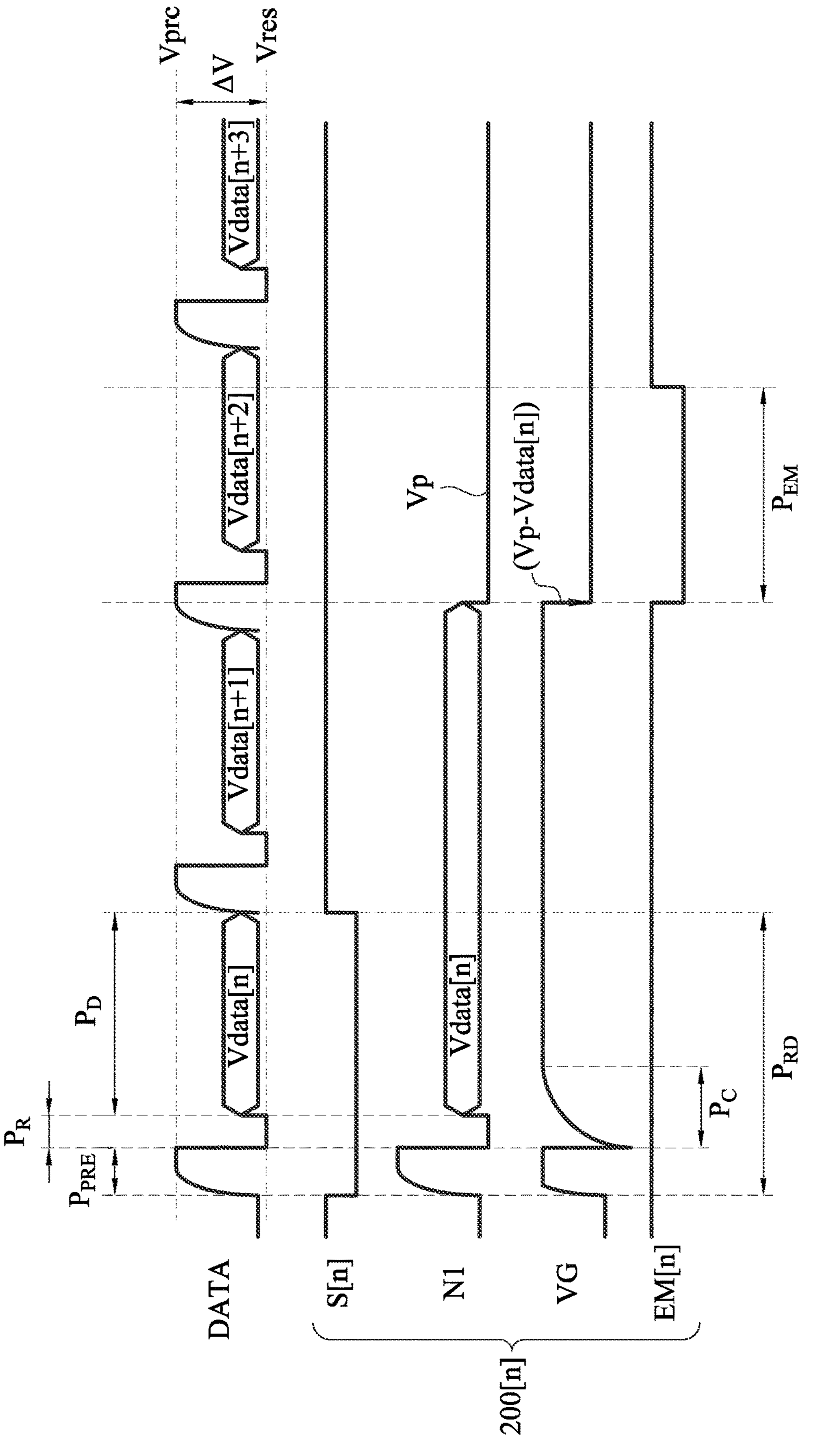
FIG. 2B depicts a timing diagram of waveform of signals and voltages at nodes according to some embodiments of the present disclosure.

A description is provided with reference to FIG. 2A and FIG. 2B. FIG. 2B depicts a timing diagram of waveform of signals and voltages at nodes according to some embodiments of the present disclosure. As shown in FIG. 2B, operations of the pixel circuit 200[*n*] in a display cycle includes two periods which are a reset and data setting period $P_{RD}$ and an emission period $P_{EM}$. To be noted that, the time lengths of these periods in FIG. 2B are for illustration, and which are not intended to limit the present disclosure.

Specifically, the control signal Sn[n] is at a first logic level (e.g. enable voltage/low logic level) in the reset and data setting period $P_{RD}$; the control signal Sn[n] is at a second logic level (e.g. disable voltage/high logic level) in the emission period $P_{EM}$. The emission control signal EM[n] is at a second logic level (e.g. disable voltage/high logic level) in the reset and data setting period $P_{RD}$; the emission control signal EM[n] is at a first logic level (e.g. enable voltage/low logic level) in the emission period $P_{EM}$.

In some embodiments, the reset and data setting period $P_{RD}$ includes a pre-charge period $P_{PRE}$, a reset period PR and a data setting period PD.

In some embodiments, the data signal DATA is provided by a driver (not shown), and the said driver includes a source driver and a multiplex circuit. In some embodiments, the driver outputs a pre-charge voltage $V_{prc}$ as the data signal DATA in the pre-charge period $P_{PRE}$. In some embodiments, at the beginning of the reset period $P_R$ after the end of the pre-charge period $P_{PRE}$, the said driver pulls down the pre-charge voltage $V_{prc}$ to the reset voltage $V_{res}$, and the said driver outputs the reset voltage $V_{res}$ as the data signal DATA in the reset period $P_R$. In some embodiments, a time length of the reset period $P_R$ is set at 1 μs, which is enough to completely compensate a threshold voltage of the driving transistor Td, and the current for the compensation can achieve microampere level. In some embodiments, a time length of the reset period $P_R$ can be set at greater than or equal to 1 ms, which is not intended to limit the present disclosure. In some embodiments, the reset voltage $V_{res}$ can be set at 2 volts. In some embodiments, the said driver provides the data voltage Vdata[n] in the data setting period $P_D$. In some embodiments, the pre-charge voltage $V_{prc}$ and the reset voltage $V_{res}$ are in the output range of the source driver, and the pre-charge voltage $V_{prc}$ and the reset voltage $V_{res}$ can be output by the source driver. In some embodiments, the source driver pulls down the pre-charge voltage $V_{prc}$ to the reset voltage $V_{res}$, and outputs the reset voltage $V_{res}$ as the data signal DATA in the reset period $P_R$. In some embodiments, the pre-charge voltage $V_{prc}$ can be set at an upper limit of the output of the source driver, and the reset voltage $V_{res}$ can be set at a lower limit of the output of the source driver. In the other embodiments, the pre-charge voltage $V_{prc}$ and the reset voltage $V_{res}$ can be set at the other voltages, which is not intended to limit the present disclosure. In some embodiments, the pre-charge voltage $V_{prc}$ and the reset voltage $V_{res}$ are provided before each of the data voltages Vdata[n]~Vdata[n+3] of the data signal DATA to reset the corresponding pixel circuit. In some embodiments, the pre-charge voltage $V_{prc}$, the reset voltage $V_{res}$ and the data voltages Vdata[n]~Vdata[n+3] are provided by the source driver, and the multiplex circuit is connected between the source driver and data lines, in order to transmit the pre-charge voltage $V_{prc}$, the reset voltage $V_{res}$ and the data voltage Vdata[n] to the pixel circuit 200[*n*] by the multiplex circuit in one or more corresponding time intervals.

In the pre-charge period $P_{PRE}$, the reset period $P_R$ and the data setting period $P_D$ of the reset and data setting period $P_{RD}$, the first transistor T1 and the second transistor T2 are turned on according to the control signal Sn[n], and the third transistor T3 and the fourth transistor T4 are turned off according to the emission control signal EM[n]. In some embodiments, the first transistor T1 is turned on according to the control signal Sn[n] to transmit the data signal DATA to the second end of the storage capacitor Cst. In some embodiments, the second transistor T2 is turned on according to the control signal Sn[n] to conduct a current path between the control end of the driving transistor Td and the second end of the driving transistor Td.

In the pre-charge period $P_{PRE}$, the pre-charge voltage $V_{prc}$ of the data signal DATA is transmitted through the first transistor T1 to the second end of the storage capacitor Cst (/the node N1).

At the end of the pre-charge period $P_{PRE}$ and the beginning of the reset period $P_R$, the data signal DATA is pulled down from the re-charge voltage $V_{prc}$ to the reset voltage $V_{res}$. At this time, a voltage variation ΔV of the data signal DATA transfers to the control end of the driving transistor Td by coupling effect of the storage capacitor Cst, the said voltage variation ΔV refers to a difference between the pre-charge voltage $V_{prc}$ and the reset voltage $V_{res}$. As such, in the reset period $P_R$, when the first transistor T1 is turned on according to the control signal Sn[n], the storage capacitor Cst changes a voltage at the control end of the driving transistor Td by coupling effect according to the voltage variation ΔV of the data signal DATA, in order to reset the voltage at the control end of the driving transistor Td.

In the reset period $P_R$, a voltage at the control end of the driving transistor Td is pulled down to a low logic level according to the voltage variation ΔV, the driving transistor Td is turned on to conduct a current path from the system high voltage terminal OVDD through the driving transistor Td, the second transistor T2 to the control end of the driving transistor Td, until the driving transistor Td is cut-off, such that the threshold voltage of the driving transistor Td can be compensated. In some embodiments, a period of compensation operation for the threshold voltage of the driving transistor Td can be expressed by the reset period $P_R$. In some embodiments, the threshold voltage compensation period $P_C$ overlaps the reset period $P_R$, and the threshold voltage compensation operation extends to a portion of the data setting period $P_D$. The threshold voltage compensation period $P_C$ overlaps the portion of the data setting period $P_D$.

In the data setting period $P_D$, the data voltage Vdata[n] of the data signal DATA is transmitted to the second end (/the node N1) of the storage capacitor Cst. In some embodiments, when a voltage of the data signal DATA changed from the reset voltage $V_{res}$ to the data voltage Vdata[n], the driving transistor Td is still turned on and performs the compensation operation, thus the data voltage Vdata[n] does not affect the voltage at the control end of the driving transistor Td.

At the end of the threshold voltage compensation period $P_C$ for compensating threshold voltage of the driving transistor Td, a voltage at the control end of the driving transistor Td is substantially equal to (OVDD−Vth), in which the Vth refers to the threshold voltage of the driving transistor Td, and the OVDD refers to a voltage of the system high voltage terminal OVDD. At this time, a voltage at the second end of the storage capacitor Cst is substantially equal to the data voltage Vdata[n].

In the emission period $P_{EM}$, the first transistor T1 and the second transistor T2 are turned off according to the control signal Sn[n], and the third transistor T3 and the fourth transistor T4 are turned on according to the emission control signal EM[n]. In some embodiments, the third transistor T3 is turned on according to the emission control signal EM[n] to transmit the reference voltage Vp to the second end (the node N1) of the storage capacitor Cst. That is, when the third transistor T3 is turned on, the voltage at the second end of the storage capacitor Cst is variated from the data voltage Vdata[n] to the reference voltage Vp, the variation is transferred to the control end of the driving transistor Td by the storage capacitor Cst, such that the voltage at the control end of the driving transistor Td includes a factor of the data voltage Vdata[n]. At this time, a voltage at the control end of the driving transistor Td is substantially equal to [(OVDD−Vth)+(Vp−Vdata[n])]. As such, in the emission period $P_{EM}$, the third transistor T3 is turned on according to the emission control signal EM to couple a difference between the reference voltage Vp and the data voltage Vdata[n] to the control end of the driving transistor Td by coupling effect of the storage capacitor Cst.

In the emission period $P_{EM}$, the fourth transistor T4 is turned on according to the emission control signal EM[n] to conduct a current path from a second end of the driving transistor Td to the system low voltage terminal OVSS, such that a driving current flows from the system high voltage terminal OVDD through the driving transistor Td, the fourth transistor T4, the light emitting element L1 to the system low voltage terminal OVSS. As such, in the emission period $P_{EM}$, the driving current controlled by the driving transistor Td according to the voltage at the control end of the driving transistor Td can be provided to the light emitting element L1 to emit light, and the amplitude of the driving current provided to the light emitting element L1 is associated with the voltage of [(OVDD−Vth)+(Vp−Vdata[n])] at the control end of the driving transistor Td.

Figure 3A:
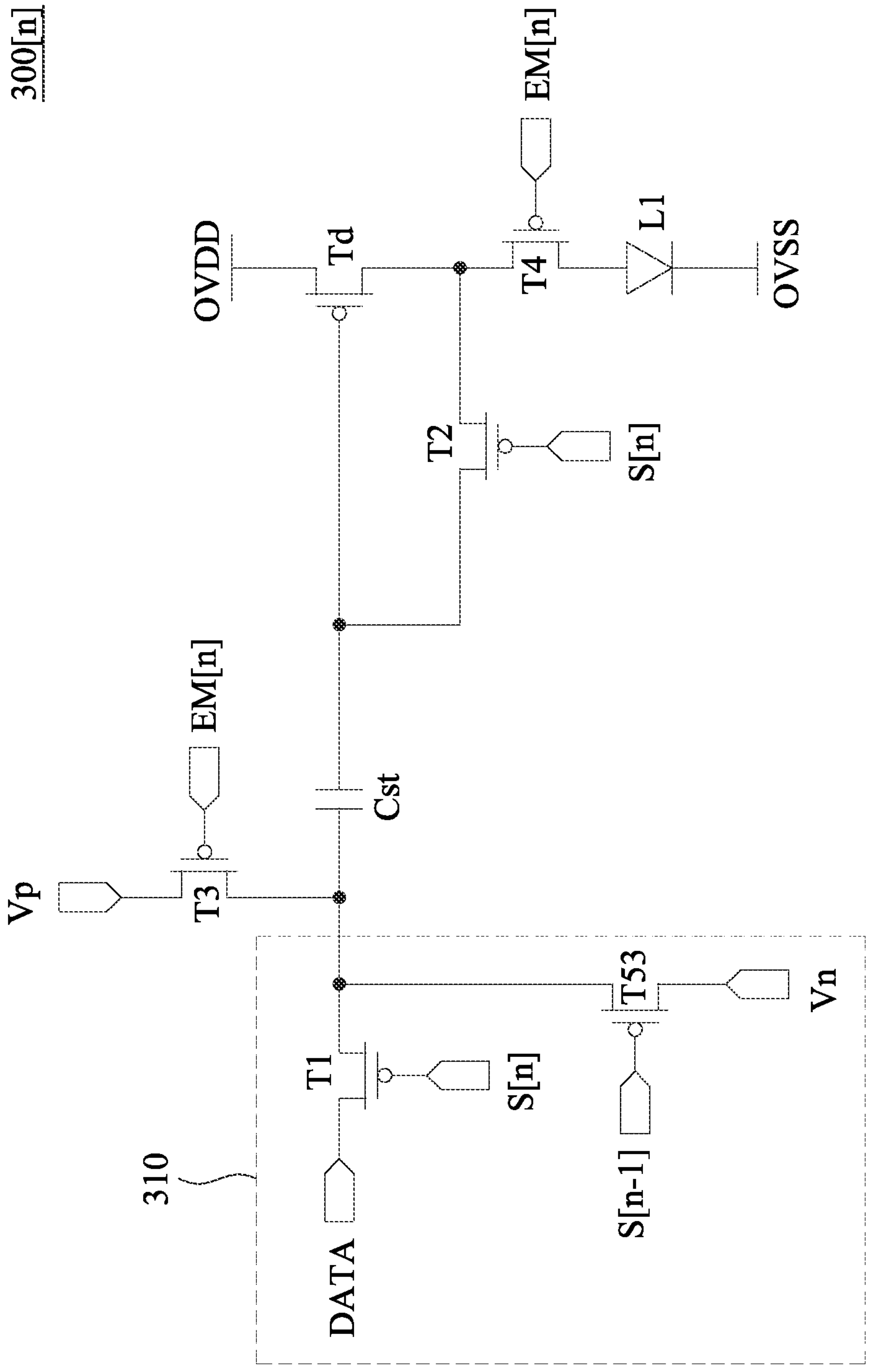
FIG. 3A depicts a pixel circuit according to some embodiments of the present disclosure.

A description is provided with reference to FIG. 3A. FIG. 3A depicts a pixel circuit 300[*n*] according to some embodiments of the present disclosure. In some embodiments, the pixel circuit 300[*n*] corresponds to the pixel circuit 100[*n*] in FIG. 1. As shown in FIG. 3A, the pixel circuit 300[*n*] includes a driving transistor Td, a second transistor T2, a third transistor T3, a fourth transistor T4, a storage capacitor Cst, a reset and data setting circuit 310 and a light emitting element L1. The circuit structure of the driving transistor Td, the second transistor T2, the third transistor T3, the fourth transistor T4, the storage capacitor Cst and the light emitting element L1 in the pixel circuit 300[*n*] is similar to the circuit structure of the driving transistor Td, the second transistor T2, the third transistor T3, the fourth transistor T4, the storage capacitor Cst and the light emitting element L1 in the pixel circuit 100[*n*], and the description is omitted here.

The reset and data setting circuit 310 includes a first transistor T1 and a fifth transistor T53. Specifically, a first end of the first transistor T1 is electrically connected to a second end of the storage capacitor Cst, and a second end of the first transistor T1 is configured to receive a data signal DATA. A first end of the fifth transistor T53 is electrically connected to a second end of the storage capacitor Cst, and the second end of the fifth transistor T53 is configured to receive a reference voltage Vn. In some embodiments, the reference voltage Vn is a negative voltage.

In some embodiments, a control end of the first transistor T1 is configured to receive a control signal Sn[n], and a control end of the fifth transistor T53 receives a control signal Sn[n-1]. In some embodiments, the control signal Sn[n] is provided to the pixel circuit 300[*n*] at a current stage, and the control signal Sn[n-1] is provided to a pixel circuit at a previous stage or a pixel circuit in a previous pixel line. In the other embodiments, the control signals Sn[n] and Sn[n-1] are irrelevant in order, which is not intended to limit the present disclosure.

Figure 3B:
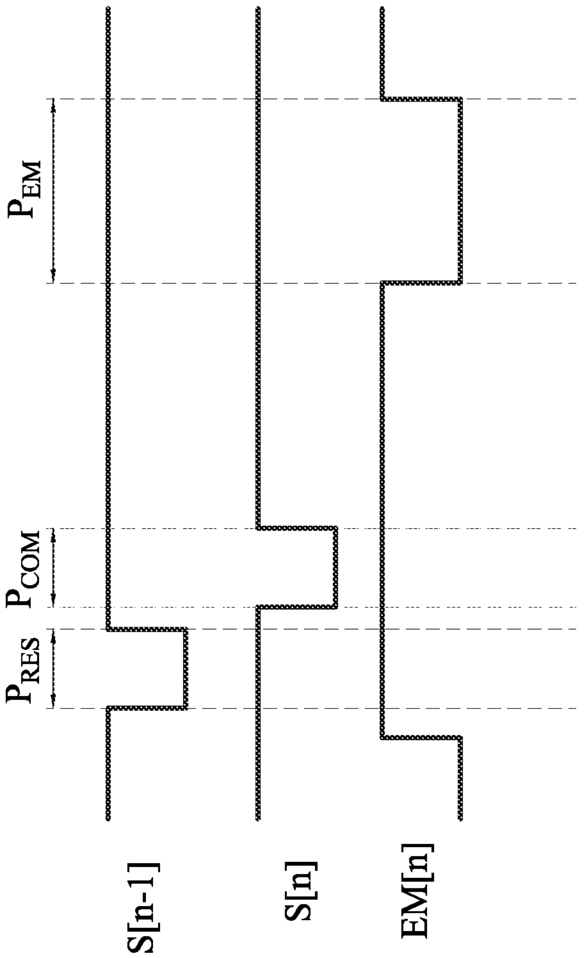
FIG. 3B depicts a timing diagram of waveform of signals and voltages at nodes according to some embodiments of the present disclosure.

A description is provided with reference to FIGS. 3A and 3B. FIG. 3B depicts a timing diagram of waveform of signals and voltages at nodes according to some embodiments of the present disclosure. As shown in FIG. 3B, of the operations of the pixel circuit 300[*n*] in a display cycle can be divided into three periods which are a reset period $P_{RES}$, a compensation period $P_{COM}$ and an emission period $P_{EM}$. To be noted that, the time lengths of the periods in FIG. 3B are for illustration, it is not intended to limit the present disclosure.

Specifically, the control signal Sn[n-1] is at a first logic level (e.g. an enable voltage/low logic level) in the reset period $P_{RES}$; the control signal Sn[n−1] is at a second logic level (e.g. a disable voltage/high logic level) in the compensation period $P_{COM}$ and the emission period $P_{EM}$. The control signal Sn[n] is at a first logic level (e.g. an enable voltage/low logic level) in the compensation period $P_{COM}$; the control signal Sn[n] is at a second logic level (e.g. a disable voltage/high logic level) in the reset period $P_{RES}$ and the emission period $P_{EM}$. The emission control signal EM[n] is at the first logic level (e.g. an enable voltage/low logic level) in the emission period $P_{EM}$; the emission control signal EM[n] is at the second logic level (e.g. a disable voltage/high logic level) in the compensation period $P_{COM}$.

In the reset period $P_{RES}$, the fifth transistor is turned according to the control signal S[n-1]. The first transistor T1 and the second transistor T2 are turned off according to the control signal S[n], and the third transistor T3 and the fourth transistor T4 are turned off according to the emission control signal EM[n]. In some embodiments, the fifth transistor T53 is turned according to the control signal S[n-1] to transmit the reference voltage Vn to the second end of the storage capacitor Cst. In some embodiments, a voltage potential of the reference voltage Vp is higher than the reference voltage Vn. After the emission operation in a previous display cycle is completed, a voltage at the second end of the storage capacitor Cst is substantially equal to the reference voltage Vp. In some embodiments, in a current display cycle, when the fifth transistor T53 is turned on, a voltage at the second end of the storage capacitor Cst is varied from the reference voltage Vp to the reference voltage Vn, this variation transfers to the control end of the driving transistor Td through the storage capacitor Cst to perform the reset operation. At this time, the control end of the driving transistor Td is at an enable voltage and the driving transistor Td is turned on.

As such, in the reset period $P_{RES}$, the fifth transistor T53 is turned on according to the control signal S[n-1] to couple a difference between the reference voltage Vn and the reference voltage Vp to the control end of the driving transistor Td by coupling effect of the storage capacitor Cst.

In the compensation period $P_{COM}$, the first transistor T1 and the second transistor T2 are turned on according to the control signal S[n]. The fifth transistor T53 is turned off according to the control signal S[n-1], and the third transistor T3 and the fourth transistor T4 are turned off according to the emission control signal EM[n]. In some embodiments, the first transistor T1 is turned on according to the control signal S[n] to transmit the data voltage of the data signal DATA to the second end of the storage capacitor Cst. In some embodiments, the second transistor T2 is turned on according to the control signal S[n] to transmit the voltage of the system high voltage terminal OVDD through the driving transistor Td, the second transistor T2 to the control end of the driving transistor Td, until the driving transistor Td is cut-off, so as to perform the compensation operation. At this time, a voltage at the control end of the driving transistor Td is substantially equal to (OVDD−Vth).

In the compensation period $P_{COM}$, the third transistor T3 and the fourth transistor T4 are turned on according to the emission control signal EM[n]. The first transistor T1 and the second transistor T2 are turned off according to the second transistor T2, and the fifth transistor T53 is turned off according to the control signal S[n-1]. In some embodiments, the third transistor T3 is turned on according to the emission control signal EM[n] to vary a voltage at the second end of the storage capacitor Cst from the data voltage to the reference voltage Vp, this variation is transferred to the control end of the driving transistor Td by the storage capacitor Cst, such that a voltage at the control end of the driving transistor Td is substantially equal to [(OVDD−Vth)+(Vp−Vdata)], in which Vdata refers to the data voltage. As such, in the emission period $P_{EM}$, the third transistor T3 is turned on according to the emission control signal EM[n] to couple a difference between the reference voltage Vp and the data voltage to the control end of the driving transistor Td by coupling effect of the storage capacitor Cst.

In the emission period $P_{EM}$, the fourth transistor T4 is turned on according to the emission control signal EM[n] to conduct a current path between a second end of the driving transistor Td and the system high voltage terminal OVDD, such that a driving current flow from the system high voltage terminal OVDD through the driving transistor Td, the fourth transistor T4, the light emitting element L1 to the system low voltage terminal OVSS. As such, in the emission period $P_{EM}$, the driving current controlled by the driving transistor Td according to a voltage at the control end of the driving transistor Td can be provided to the emitting element L1 to emit light, and an amplitude of the driving current provided to the light emitting element L1 is associated to the voltage of [(OVDD−Vth)+(Vp−Vdata[n])] at the control end of the driving transistor Td.

Figure 4A:
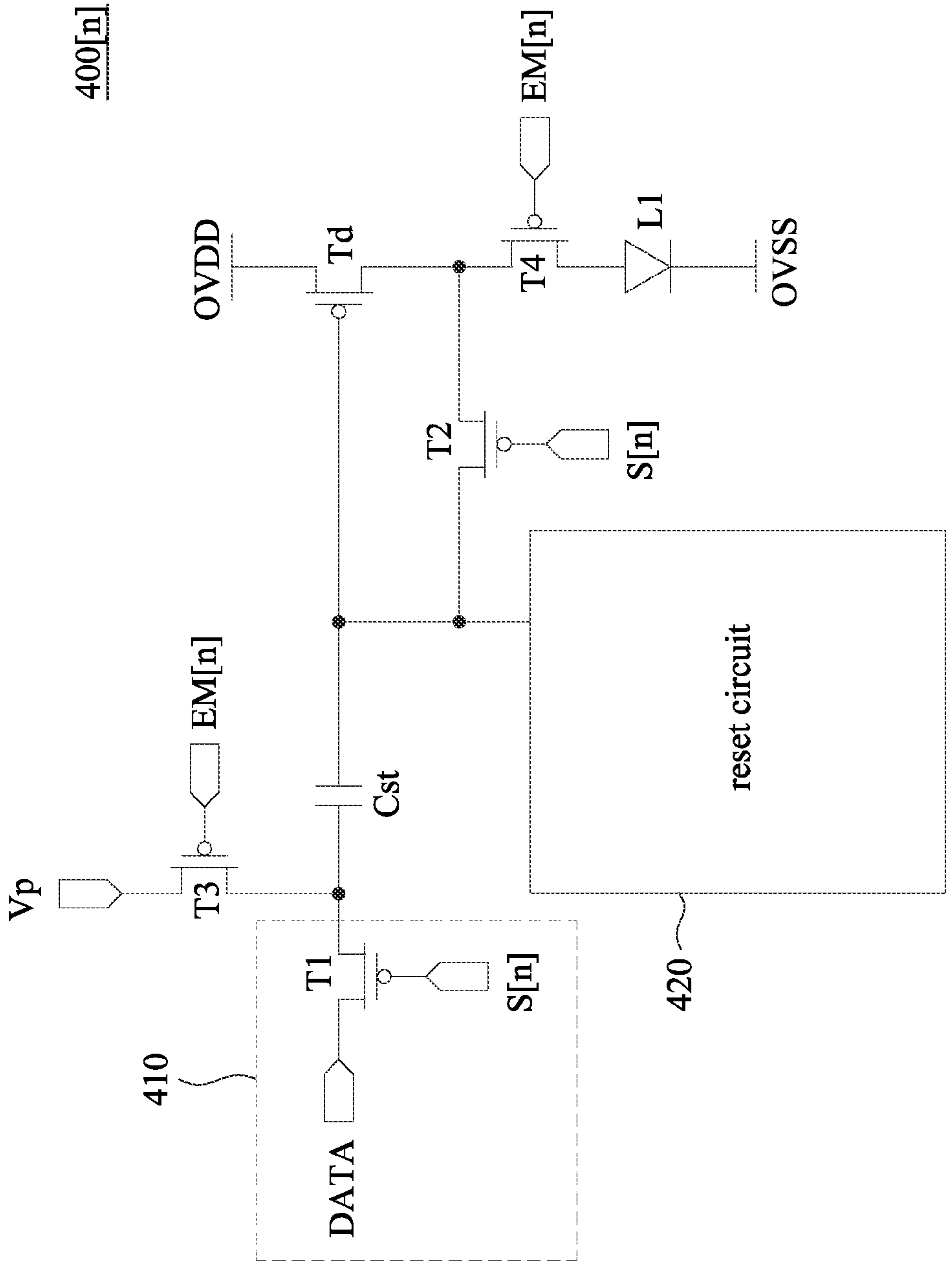
FIG. 4A depicts a pixel circuit according to some embodiments of the present disclosure.

A description is provided with reference to FIG. 4A. FIG. 4A depicts a pixel circuit 400[*n*] according to some embodiments of the present disclosure. As shown in FIG. 4A, the pixel circuit 400[*n*] includes a driving transistor Td, a second transistor T2, a third transistor T3, a fourth transistor T4, a storage capacitor Cst, a data setting circuit 410, a reset circuit 420 and a light emitting element L1. The circuit structure of the driving transistor Td, the second transistor T2, the third transistor T3, the fourth transistor T4, the storage capacitor Cst and the light emitting element L1 of pixel circuit 400[*n*] is similar to the circuit structure of the driving transistor Td, the second transistor T2, the third transistor T3, the fourth transistor T4, the storage capacitor Cst and the light emitting element L1 of pixel circuit 300[*n*], and the description is omitted here.

In some embodiments, the data setting circuit 410 includes a first transistor T1. A first end of the first transistor T1 is electrically connected to a second end of the storage capacitor Cst, and a second end of the first transistor T1 is configured to receive the data signal DATA. In some embodiments, the control end of the first transistor T1 is configured to receive a control signal Sn[n].

Figure 4B:
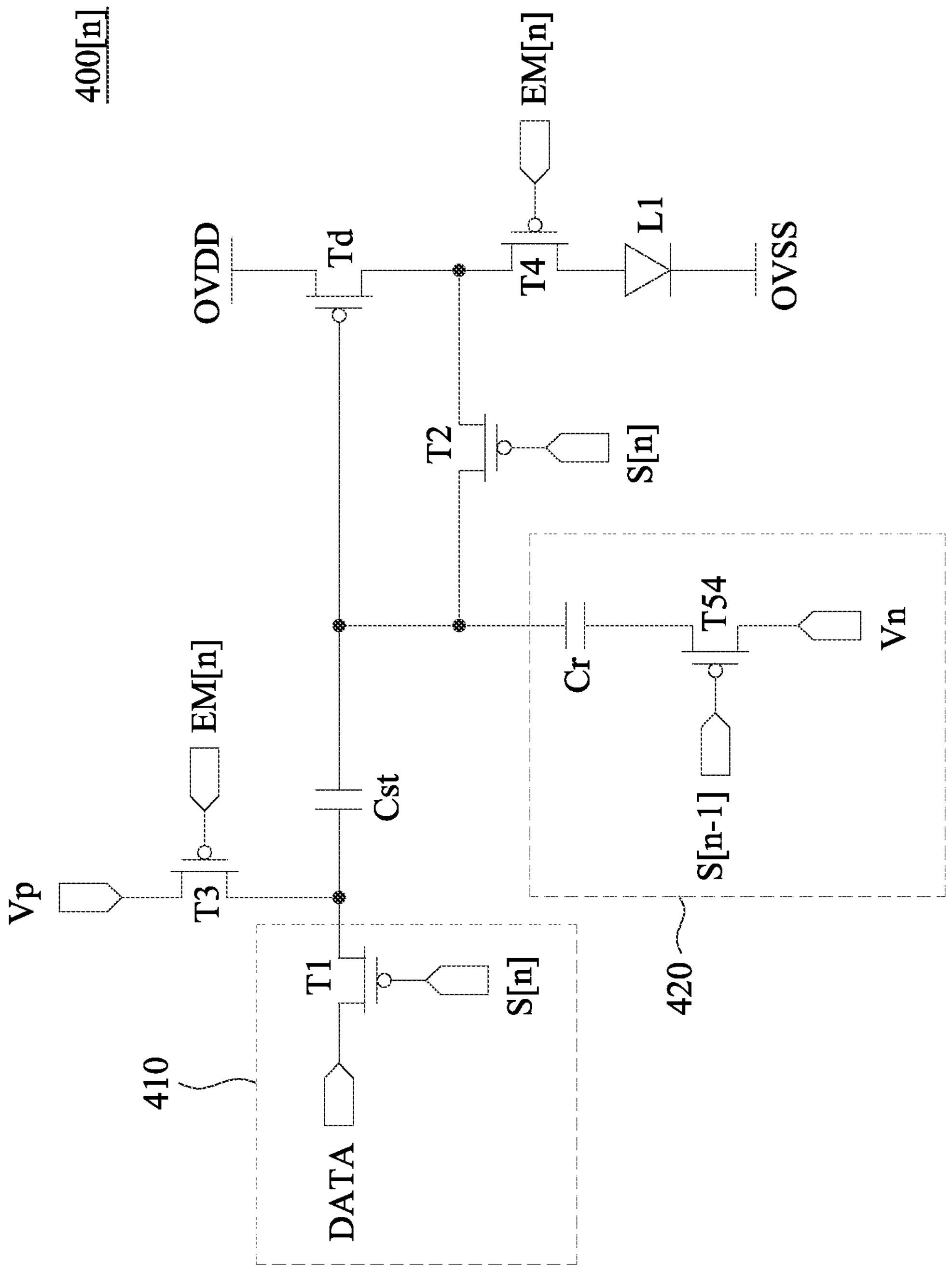
FIG. 4B depicts a pixel circuit according to some embodiments of the present disclosure.

A description is provided with reference to FIG. 4A and FIG. 4B. FIG. 4B depicts a pixel circuit 400[*n*] according to some embodiments of the present disclosure. As shown in FIG. 4B, the reset circuit 420 includes a fifth transistor T54 and a reset capacitor Cr. A first end of the fifth transistor T54 is configured to receive a reference voltage Vn. In some embodiments, a first end of the reset capacitor Cr is electrically connected to a second end of the fifth transistor T54, and a second end of the reset capacitor Cr is electrically connected to the control end of the driving transistor Td.

The operation timing of the control signals in FIG. 3B can be used to the pixel circuit 400[*n*] in FIG. 4B. A description is provided with reference to FIG. 3B, FIG. 4A and FIG. 4B. The operations of the pixel circuit 400[*n*] in a display cycle can be divided to three periods which are a reset period $P_{RES}$, a compensation period $P_{COM}$ and an emission period $P_{EM}$.

In the reset period $P_{RES}$, the fifth transistor T54 is turned on according to the control signal S[n-1]. The first transistor T1 and the second transistor T2 are turned off according to the control signal S[n], and the third transistor T3 and the fourth transistor T4 are turned off according to the emission control signal EM[n]. In some embodiments, the fifth transistor T54 is turned on according to the control signal S[n-1] to transmit the reference voltage Vn to the second end of the storage capacitor Cst. In some embodiments, the reference voltage Vn is a negative voltage. When an emission operation in a previous display cycle is completed, a voltage at the control end of the driving transistor Td is substantially equal to [(VDD−Vth)+(Vp−Data)], which a is positive voltage and is greater than the reference voltage Vn. Therefore, when the fifth transistor T54 is turned on, the reference voltage Vn can pull down a voltage at the control end of the driving transistor Td by coupling effect of reset capacitor Cr, in order to perform the reset operation.

As such, in the reset period $P_{RES}$, the fifth transistor T54 is turned on according to the control signal S[n-1], such that the storage capacitor Cst reset a voltage at the control end of the driving transistor Td by capacitive coupling effect according to a voltage variation at the first end of the reset capacitor Cr.

In the compensation period $P_{COM}$, the first transistor T1 and the second transistor T2 are turned on according to the control signal S[n]. The fifth transistor T54 is turned off according to the control signal S[n-1], and the third transistor T3 and the fourth transistor T4 are turned off according to the emission control signal EM[n]. In some embodiments, the first transistor T1 is turned on according to the control signal S[n] to transmit the data voltage of the data signal DATA to the second end of the storage capacitor Cst. In some embodiments, the second transistor T2 is turned on according to the control signal S[n], such that a voltage of the system high voltage terminal OVDD is transmitted through the driving transistor Td, the second transistor T2 to the control end of the driving transistor Td, until the driving transistor Td is cut-off, in order to perform the reset operation. At this time, a voltage at the control end of the driving transistor Td is substantially equal to the (OVDD−Vth).

In the emission period $P_{EM}$, the third transistor T3 and the fourth transistor T4 are turned according to the emission control signal EM[n]. The first transistor T1 and the second transistor T2 are turned off according to the control signal S[n], and the fifth transistor T54 is turned off according to the control signal S[n-1]. In some embodiments, the third transistor T3 is turned on according to the emission control signal EM[n] to vary a voltage at the second end of the storage capacitor Cst from the data voltage to the reference voltage Vp, this variation transfers to the control end of the driving transistor Td through the storage capacitor Cst, such that a voltage at the control end of the driving transistor Td is substantially equal to [(OVDD−Vth)+(Vp−Vdata)], in which Vdata refers to the data voltage. As such, in the emission period $P_{EM}$, the third transistor T3 is turned on according to the control signal EM to couple a difference between the reference voltage Vp and the data voltage to the control end of the driving transistor Td by coupling effect of the storage capacitor Cst.

In the emission period $P_{EM}$, the fourth transistor T4 is turned on according to the emission control signal EM[n] to conduct a driving current path from the system high voltage terminal OVDD through the driving transistor Td, the fourth transistor T4, the light emitting element L1 to the system low voltage terminal OVSS. As such, in the emission period $P_{EM}$, the driving current controlled by the driving transistor Td according to a voltage at the control end thereof can be provided to the light emitting element L1 to emit light, and an amplitude of the driving current is associated with a voltage of [(OVDD−Vth)+(Vp−Vdata[n])] at the control end of the driving transistor Td.

Summary, the present disclosure provides pixel circuits 100[*n*]~400[*n*], and the operations thereof include reset operations. A path from the system high voltage terminal OVDD to the reference voltage Vn is removed from the pixel circuit 200[*n*]. A path from the system high voltage terminal OVDD to the reference voltage Vn of each pixel circuits 300[*n*]~400[*n*] is electrically isolated during the reset period $P_{RES}$. As such, the pixel circuits 100[*n*]~400[*n*] can avoid generating the leakage current in the reset operation, in order to reduce the power consumption.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A pixel circuit, comprising:

a driving transistor, with a first end electrically connected to a system high voltage terminal, wherein the driving transistor is configured to control a driving current provided to a light emitting element;

a storage capacitor, with a first end electrically connected to a control end of the driving transistor;

a first transistor, with a first end electrically connected to a second end of the storage capacitor, with a second end configured to receive a data signal;

a second transistor, electrically connected between a second end of the driving transistor and the control end of the driving transistor;

a third transistor, with a first end configured to receive a reference voltage, with a second end electrically connected to a second end of the storage capacitor; and a fourth transistor, electrically connected between the second end of the driving transistor and a system low voltage terminal, wherein when the first transistor and the second transistor are turned on according to a first control signal, a voltage variation of the data signal coupled by the storage capacitor to the control end of the driving transistor resets and turns on the driving transistor, and wherein the voltage variation is a change from a pre-charge voltage to a reset voltage which is lower than the pre-charge voltage.

2. The pixel circuit of claim 1, wherein in a compensation period, the second transistor is turned on according to a control signal to conduct a current path between the second end of the driving transistor and the control end of the driving transistor, so that a voltage at the system high voltage terminal is transmitted through the driving transistor, the second transistor to the control end of the driving transistor, until the driving transistor is cut-off.

3. The pixel circuit of claim 1, wherein in a data setting period, the first transistor is turned on according to a control signal to transmit a data voltage of the data signal to a second end of the storage capacitor.

4. The pixel circuit of claim 3, wherein in an emission period, the third transistor is turned on according to an emission control signal to couple a difference between the reference voltage and the data voltage to the control end of the driving transistor by coupling effect of the storage capacitor.

5. The pixel circuit of claim 1, wherein in an emission period, the fourth transistor is turned on according to an emission control signal to conduct a current path between the second end of the driving transistor to the system low voltage terminal, so that the driving current flows from the driving transistor, the fourth transistor to the system low voltage terminal.

6. A pixel circuit, comprising:

a driving transistor, with a first end electrically connected to a system high voltage terminal, wherein the driving transistor is configured to control a driving current provided to a light emitting element;

a storage capacitor, with a first end electrically connected to a control end of the driving transistor;

a first transistor, with a first end electrically connected to a second end of the storage capacitor, with a second end configured to receive a data signal;

a second transistor, electrically connected between a second end of the driving transistor and the control end of the driving transistor;

a third transistor, with a first end configured to receive a first reference voltage, with a second end electrically connected to the second end of the storage capacitor;

a fourth transistor, electrically connected between the second end of the driving transistor and a system low voltage terminal; and a fifth transistor, with a first end electrically connected to the second end of the storage capacitor, with a second end configured to receive a second reference voltage, and wherein:

in a reset period, the fifth transistor is turned on according to a first control signal to reset a voltage at the control end of the driving transistor by coupling effect of the storage capacitor according to a voltage variation at the second end of the storage capacitor; and in the reset period, the fifth transistor is turned on according to the first control signal to couple a difference between the second reference voltage and the first reference voltage to the control end of the driving transistor by the coupling effect of the storage capacitor.

7. The pixel circuit of claim 6, wherein a control end of the fifth transistor is configured to receive the first control signal, wherein a control end of the first transistor and a control end of the second transistor are configured to receive a second signal, and wherein a control end of the third transistor is configured to receive an emission control signal.

8. The pixel circuit of claim 6, wherein in a compensation period, the second transistor is turned on according to a second control signal to transmit a voltage of the system high voltage terminal through the driving transistor, the second transistor to the control end of the driving transistor, until the driving transistor is cut-off.

9. The pixel circuit of claim 6, wherein in a compensation period, the first transistor is turned on according to a second control signal to transmit a data voltage of the data signal to the second end of the storage capacitor.

10. The pixel circuit of claim 6, wherein in an emission period, the third transistor is turned on according to an emission control signal to vary a voltage at the second end of the storage capacitor from a data voltage to the first reference voltage, and wherein the variation transfers to the control end of the driving transistor through the storage capacitor.

11. The pixel circuit of claim 6, wherein in an emission period, the third transistor is turned on according to an emission control signal to couple a difference between the first reference voltage and a data voltage to the control end of the driving transistor by the coupling effect of the storage capacitor.

12. The pixel circuit of claim 6, wherein in an emission period, the fourth transistor is turned on according to an emission control signal to conduct a current path between the second end of the driving transistor to the system low voltage terminal, so that the driving current flows from the driving transistor, the fourth transistor to the system low voltage terminal.

13. A pixel circuit, comprising:

a driving transistor, with a first end electrically connected to a system high voltage terminal, wherein the driving transistor is configured to control a driving current provided to a light emitting element;

a storage capacitor, with a first end electrically connected to a control end of the driving transistor;

a first transistor, with a first end electrically connected to a second end of the storage capacitor, with a second end configured to receive a data signal;

a second transistor, electrically connected between a second end of the driving transistor and the control end of the driving transistor;

a third transistor, with a first end configured to receive a first reference voltage, with a second end electrically connected to the second end of the storage capacitor;

a fourth transistor, electrically connected between the second end of the driving transistor and a system low voltage terminal;

a fifth transistor, with a first end configured to receive a second reference voltage; and a reset capacitor, with a first end electrically connected to a second end of the fifth transistor, with a second end electrically connected to the control end of the driving transistor, and wherein a first control signal is applied to the fifth transistor to turn off the fifth transistor in an emission period and to turn on the fifth transistor in a reset period.

14. The pixel circuit of claim 13, wherein in the reset period, the fifth transistor is turned on according to the first control signal to reset a voltage at the control end of the driving transistor by coupling effect of the storage capacitor according to a voltage variation at the first end of the reset capacitor.

15. The pixel circuit of claim 13, wherein in a compensation period, the first transistor is turned on according to a second control signal to transmit a data voltage of the data signal to the second end of the storage capacitor.

16. The pixel circuit of claim 13, wherein in a compensation period, the second transistor is turned on according to a second control signal, such that a voltage of the system high voltage terminal is transmitted through the driving transistor, the second transistor to the control end of the driving transistor, until the driving transistor is cut-off.

17. The pixel circuit of claim 13, wherein in the emission period, the third transistor is turned on according to an emission control signal to vary a voltage at the second end of the storage capacitor from a data voltage to the first reference voltage, and wherein the variation transfers to the control end of the driving transistor through the storage capacitor.

* * * * *